May 6, 1952 F. F. MORLEY 2,595,871
AUTOMATIC SCALE

Filed March 26, 1948 2 SHEETS—SHEET 1

FRANK F. MORLEY
INVENTOR.

BY Hubert Miller

May 6, 1952 F. F. MORLEY 2,595,871
AUTOMATIC SCALE

Filed March 26, 1948 2 SHEETS—SHEET 2

FRANK F. MORLEY
Inventor

By Hubert Miller
Attorney

Patented May 6, 1952

2,595,871

UNITED STATES PATENT OFFICE 2,595,871

AUTOMATIC SCALE

Frank F. Morley, Wichita, Kans., assignor to Wichita Scale & Manufacturing Co., Inc., Wichita, Kans.

Application March 26, 1948, Serial No. 17,180

3 Claims. (Cl. 249—39)

This invention relates to improvements in beam type automatic weighing machines or scales. The particular type of scale to which this invention relates is shown and described generally in Patents Numbered 760,485, issued May 24, 1904, and 1,346,684, issued July 13, 1920, and includes: a weigh beam; a weigh hopper on one end of the beam; a counterweight on the other end of the beam; a feed chute above the open upper end of the hopper for feeding material into it; a control gate on the feed chute; mechanism actuated by the downward movement of the weigh hopper, as it is filled, for closing the feed chute control gate when a predetermined weight of material has been introduced into the hopper; mechanism the movement of which is initiated by a cooperating lever of feed chute gate closing mechanism for opening the hopper door immediately after the feed chute gate is closed; means for closing and locking the hopper door after the hopper has emptied; and means responsive to the movement of the hopper door closing mechanism in a door closing direction to initiate re-opening of the feed chute gate through said cooperating lever, thus starting another cycle in the automatic operation, after the hopper door has closed.

The particular part of such an automatic scale to which this invention directly relates is the mechanism for opening, closing, and locking the hopper door in proper sequence in the weighing cycle.

It is the primary object of this invention to improve and simplify the mechanisms heretofore used to perform the functions mentioned.

It is an additional important object of the invention to provide a mechanism for the mentioned purposes which cooperates with the feed chute gate controlling mechanism to assure that the feed chute gate cannot open until the hopper door is closed, and to further assure that the hopper door cannot open until the desired predetermined amount of material has entered the hopper, and the feed chute gate has closed, thus positively eliminating the passage of material through the scale without the material being weighed.

Another object of the invention is to provide a mechanism for the purpose mentioned which includes only three moving parts, said parts cooperating in such a manner that wear on any or all of them will not materially affect their efficient operation, thus affording years of trouble free service.

The invention, together with other objects attending its production, will be more clearly understood when the following description is read in connection with the accompanying drawings, which are provided for illustrative purposes only, and in which.

Figure 2:
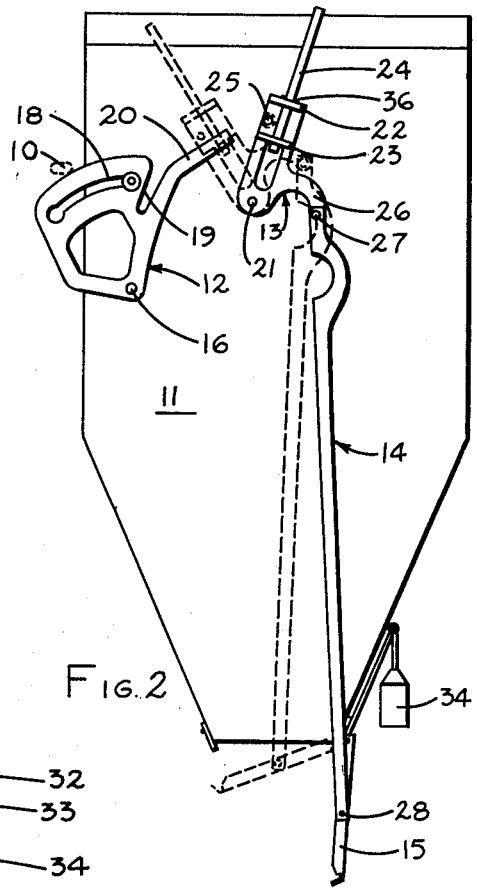
Figure 2 is a view similar to Figure 1, the solid lines showing the various parts of the mechanism in the relative positions they assume when the hopper door is open, the dotted lines showing the relative positions assumed by the parts when the hopper door is partially open.
Figure 3:
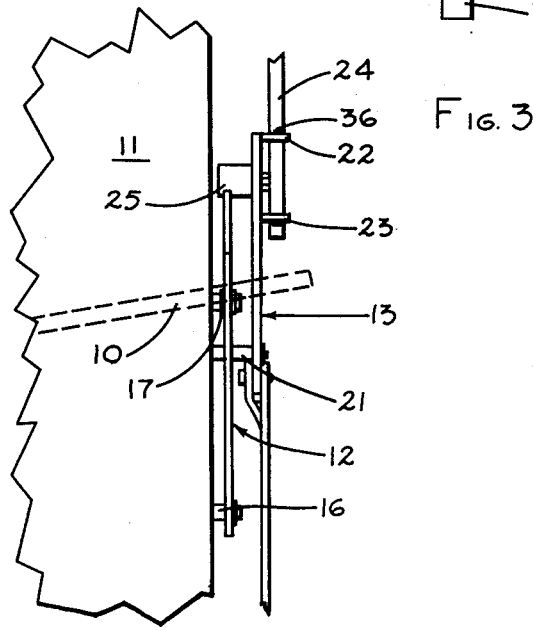
Figure 3 is a fragmentary side elevation of the mechanism illustrated in Figures 1 and 2.
Figure 4:
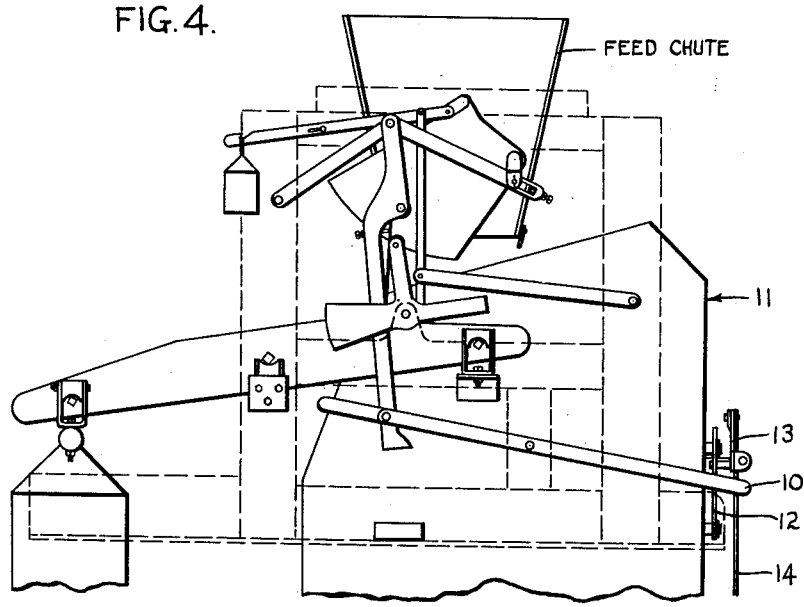
Fig. 4 is a side elevation of the upper end of a scale embodying the invention, and illustrates mechanism for controlling the opening and closing of the feed chute gate.

In describing the invention it is not considered necessary to either illustrate or describe the complete scale, nor the feed chute gate controlling mechanism. It is believed that one familiar with the art will clearly understand the cooperation between the hopper door controlling mechanism and the feed chute gate controlling mechanism if it is borne in mind that the element 10, represented in all the figures by broken lines, is a pivoted trip lever which is mechanically connected to the feed chute gate controlling mechanism. Movement of the free end of this trip lever 10 into the position shown in Figure 1, as an almost immediate consequence of the closing of the hopper door, results in the almost simultaneous opening of the feed chute gate. The free end of this lever 10 remains in its Figure 1 position so long as the feed chute gate is open. When the predetermined weight of material has entered the hopper 11, the feed chute gate is closed and the free end of the trip lever 10 simultaneously moves upward with considerable force into the position shown in Figures 2 and 3. The two positions illustrated are the only dwell positions of the free end of this lever, and its only permitted movement is between these two positions.

Referring now to the invention proper, it consists of only three major parts, i. e.—a sector-like cam member 12, a peculiar shaped bell crank 13, and a link 14 connecting one arm of the bell crank to the hopper door 15. All move in planes substantially parallel to the adjacent surface of the hopper 11.

The cam 12 is a plate which is pivotally mounted on a pin 16. This pin is anchored to the front wall of the hopper 11. A guide roller 17, rotatably mounted on a fixed pin which is anchored to the hopper wall, projects through an arcuate slot 18 to limit the oscillating movement of the cam plate. The enlargement at one end of this slot simply facilitates the entrance and removal of the roller 17, which has side flanges which overlap the sides of the narrow portion of the slot. The cam plate 12 is also provided with a cam slot 19, and an outwardly projecting arm 20, the upper surface of which is a continuation of one side of the slot 19. In operation of the scale, the cam 12 moves only between the positions in which it is shown in Figures 1 and 2.

The bell crank 13 is in the form of a flat plate pivotally mounted on a pin 21 projecting outwardly from the hopper wall. This pin 21 is longer than the pin 16, so that the bell crank moves in a plane spaced slightly outward from the cam 12, as clearly shown in Figure 3. One arm of the crank is provided with outwardly projecting spaced lugs 22 and 23 which are drilled to receive and hold a removable weight bar 24. This same end of the bell crank also carries a cam actuating member 25, which is preferably in the form of a ball bearing roller, projecting from the inner surface of the bell crank in a position to roll on the upper surface of the arm 20 and on the edges of the cam slot 19. The other arm 26 of the bell crank is arcuate in shape, and is pivotally connected at 27 to one end of the link 14, the other end of which is pivotally connected at 28 to one side of the hopper door 15. This hopper door is hinged at 29, along one of its edges, to the hopper 11 by means of a hinge bracket 30. An arm 31 is rigidly connected to the door 15, and projects away from the door proper on the opposite side of the hinge. The outer end of this arm is pivotally connected at 32 to a hanger 33, which in turn is connected to a weight box 34, which carries a desired number of compact weights.

Operation

Figure 1:
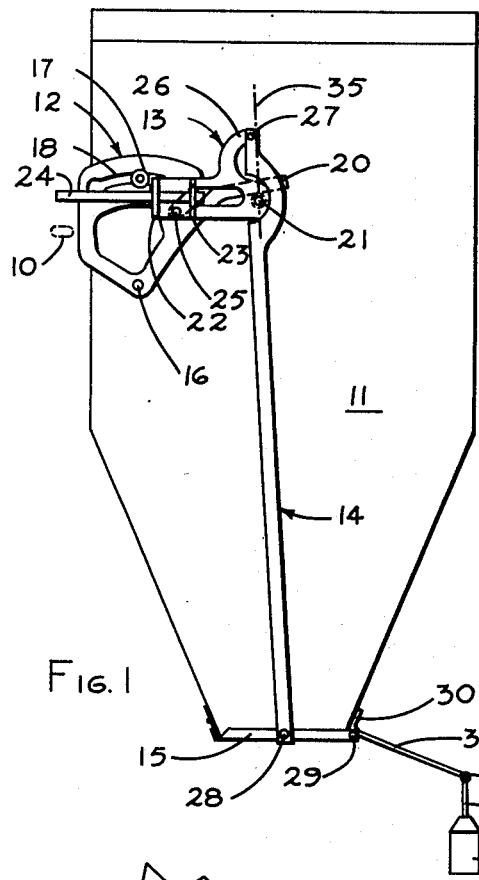
Figure 1 is a front elevation of hopper door controlling mechanism embodying the invention, the mechanism being shown installed on a hopper, the door of the hopper being shown in the closed position.

With the parts of the described mechanism in the relative positions shown in Figure 1, the hopper door 15 is closed and locked against opening, material is flowing into the hopper through the open feed chute gate (not shown), and the free end of the lever 10 of the feed chute gate controlling mechanism is in the position shown. It will be noted that the pivot pin 27 lies in a position slightly to the left of an extended dead center line passing through the pivot pins 21 and 28. This means that the weight of grain on the hopper door is tending to rotate the bell crank 13 in a counterclockwise direction. Such movement is resisted, however, by the resistance of the cam 12 against such movement. The lower edge of the arm 29 rests on the fixed pin 21, and the lower edge of the cam slot 19 is in contact with the surface of the roller 25. The parts are thus in a state of balance. The only way the hopper door could open would be for the bell crank 13 to rotate clockwise. Such clockwise movement would not be possible except with simultaneous counterclockwise movement of the cam 12. Such movement of the cam is prevented by the free end of the lever 10, which has no permitted sidewise movement. Since the end of the lever 10 remains in the position shown until the hopper receives its predetermined load of material, and until the feed chute gate has closed preventing additional material from entering the hopper, it is plain to see that the hopper door is positively locked against opening until the mentioned conditions occur.

When the hopper has received its predetermined load, almost simultaneous with the positive closing of the feed chute gate, the end of the lever 10 moves upward with considerable force. In doing so it contacts the bar 24 and moves the bell crank 13 clockwise. The lever 10 almost immediately assumes its Figure 2 position. During the initial clockwise movement of the bell crank, the pin 27 passes to the opposite side of the dead center line 35. The hopper door is thus unlocked and the weight of material on the door immediately forces it into the Figure 2 full open position. During the continued clockwise movement of the bell crank 13 the roller 25 cams the upper edge of the cam slot 19, and thus forces the cam to rotate counterclockwise into its Figure 2 position. The cam remains in this position so long as the hopper door is open, and while in this position it positively prevents the downward movement of the free end of the lever 10, which movement must occur before the feed chute gate can open. The cam 12 thus positively prevents the opening of the feed chute gate until after the hopper door is closed.

When the material has emptied from the hopper, the weight 34 pivots the door 15 toward a closed position, and in doing so forces the link 14 upward. The link in turn forces the bell crank 13 to rotate counterclockwise. One intermediate position of these two parts is shown by the broken lines of Figure 2. In this position the roller 25 on the bell crank is contacting the upper edge of the arm 20. Further counterclockwise movement of the bell crank causes the roller 25 to force the cam 12 to rotate clockwise. This simultaneous movement of the two parts continues until both again assume their respective Figure 1 positions. It should be noted that this movement of the parts is rather rapid, so that the bar 24 carried by the bell crank has considerable momentum at the time it hits the free end of the lever 10. At the time the impact occurs, cam 12 has already moved outside the path of travel of the lever 10, so that it does not interfere with the downward travel of this lever. At the time this lever 10 is moved into its Figure 1 position by the bar 24, the hopper door is completely closed. The momentum of the bar 24 moves the pin 27 past the dead center line 35, and the hopper door is again locked. As previously stated, when the lever 10 is moved into the Figure 1 position, the feed chute gate is instantly opened, and the automatic weighing cycle begins again.

The automatic cycle may be interrupted either when the hopper is empty or when it is full by simply removing a cotter pin 36 from the bar 24, and by then moving the bar longitudinally toward the pin 21. The end of the bar is thus moved out of the path of travel of the lever 10.

From the above description it will be seen that this embodiment of the invention accomplishes the various objects set forth at the beginning of this specification. It is also believed that the above description of the invention is sufficiently clear to enable one familiar with the art to construct and use the invention.

I claim:

1. The combination with a feed chute and mechanism for opening and closing it including a trip lever which is forced by the mechanism into a first position when the gate closes, and which initiates opening of the gate when the lever is moved into a second position, of: A weight hopper having a hinged door; means urging the door toward a closed position; a bell crank pivotally mounted on the hopper for intersecting movement into and out of the path of travel of said trip lever; a rigid link having one end pivotally connected to one arm of said bell crank and the other end pivotally connected to the hopper door at a point spaced from its hinge; and a cam mounted on the hopper adjacent said bell crank and adapted to be moved thereby into and out of the path of travel of said trip lever; said bell crank and link together constituting the sole means for locking said hopper door closed, as well as means for moving said trip lever from its first position to its second position; said trip lever constituting means for contacting and initiating movement of said bell crank in a hopper door opening direction as the lever moves from its second position to its first position; and said cam constituting means for blocking movement of said trip lever from its first position to its second position.

2. A mechanism for coordinating the opening and closing of the feed chute gate and the hopper door of an automatic weighing machine of the class which includes a weighing hopper having a hinged door, a gate controlled feed chute arranged to periodically discharge material into the hopper, and mechanism for controlling the feed chute gate including a trip lever the free end of which is moved by the mechanism to a first position in response to the closing of the gate, and initiates opening of the gate when the lever is moved to a second position, said coordinating mechanism comprising: a plate type cam mounted on a fixed pivot on the hopper for limited oscillation in a path which intersects the path of travel of said trip lever, said cam when in a first position at one end of its permitted travel serving to block movement of said trip lever from its first position toward its second position, said trip lever when in its second position serving to block movement of said cam from a second position at the other end of its permitted travel toward its first position; a bell crank mounted on an adjacent fixed pivot on the hopper for limited oscillation in a path which also intersects the path of travel of the trip lever, said crank being adapted to contact the trip lever and forcibly move it from its first position toward its second position when the bell crank moves from a first position free of the trip lever to a second position in the path of the trip lever, said trip lever being adapted to contact and forcibly move the bell crank from its second position toward its first position when the trip lever moves from its second position toward its first position; an open cam slot in the cam extending inward from its peripheral edge; a pin carried by and projecting from the bell crank into the plane in which the cam moves, said pin being adapted to move into and out of said cam slot as the bell crank moves in opposite directions, the contour of the cam slots being such that as the bell crank moves from its first position toward its second position the pin and slot force the cam to move out of its trip lever blocking first position prior to the contact of the bell crank with the trip lever to move the latter toward its second position, and as the bell crank is moved from its second position toward its first position by the trip lever, the pin and slot force the cam to move from its second position into its trip lever blocking first position after the trip lever has moved into its first position; a rigid link having one end pivotally connected to one arm of the bell crank and its other end connected pivotally to the hopper door at a point spaced from the door hinge, the bell crank through said link being adapted to lock said door in a closed position when the crank is in its second position, and to free the door to open when the crank moves toward its first position; and means urging the hopper door toward a closed position, said means through the door and link also urging the bell crank toward its second position.

3. An automatic scale comprising: a weighing hopper; a hinged discharge door for the hopper; means urging the hopper door toward a closed position; a bell crank pivotally mounted on the hopper above said door; a link having one end pivotally connected to the hopper door at a point spaced from the door hinge, and having its other end pivotally connected to one arm of the bell crank, said link serving as a means for coordinating the movement of the bell crank and hopper door; a plate type cam pivotally mounted on the hopper for oscillation in a plane parallel and adjacent to the plane in which the bell crank moves; an open cam slot in the cam extending inward from its peripheral edge; a pin carried by and projecting from the bell crank into the path of travel of the cam, said pin being adapted to move into said slot as the bell crank is moved in one direction by the link and the hopper door closing means, contact of the pin with the inner end of said slot serving as a means of limiting the movement of the bell crank in said one direction, the pin and slot together serving as a means of rotating said cam in both directions, depending on the direction of rotation of the bell crank, said bell crank and link together serving as the sole means for locking the hopper door closed when the bell crank has reached its limit of travel in said one direction; a gate controlled feed chute for discharging material into the hopper; mechanism for controlling the opening and closing of the feed chute gate including a trip lever having a limited path of travel which intersects the paths of travel of both the bell crank and the cam, and the free end of which is moved in a first direction by the mechanism in response to closing of the feed chute gate, and initiates opening of the gate when the lever is moved in the opposite direction, said trip lever when moving in said first direction serving as a means of contacting and moving said bell crank in a hopper door releasing direction, said cam serving as a means of blocking movement of the trip lever in said opposite direction during the time the hopper door is open.

FRANK F. MORLEY.

REFERENCES CITED

The following references are of record in the file of this patent:

UNITED STATES PATENTS

| Number | Name | Date |
|---|---|---|
| 572,071 | Richards | Nov. 24, 1896 |
| 616,634 | Richards | Dec. 27, 1898 |
| 717,426 | MacDonald | Dec. 30, 1902 |
| 1,337,842 | Lambertz | Apr. 20, 1920 |

FOREIGN PATENTS

| Number | Country | Date |
|---|---|---|
| 565,729 | Great Britain | Nov. 24, 1944 |